US010353907B1

United States Patent
Gupta et al.

(10) Patent No.: US 10,353,907 B1
(45) Date of Patent: Jul. 16, 2019

(54) EFFICIENT INDEXING OF FEED UPDATES FOR CONTENT FEEDS

(71) Applicant: LinkedIn Corporation, Mountain View, CA (US)

(72) Inventors: Ankit Gupta, Mountain View, CA (US); Parinkumar D. Shah, Milpitas, CA (US); Swapnil A. Ghike, Sunnyvale, CA (US); Raghu Ram Hiremagalur Venkatesh, Fremont, CA (US); Shubham Gupta, San Mateo, CA (US); Roshan R. Sumbaly, Santa Clara, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 378 days.

(21) Appl. No.: 15/162,491

(22) Filed: May 23, 2016

Related U.S. Application Data

(60) Provisional application No. 62/315,537, filed on Mar. 30, 2016.

(51) Int. Cl.
*G06F 16/24* (2019.01)
*G06F 16/2457* (2019.01)
*G06F 16/248* (2019.01)
*G06F 16/22* (2019.01)
*G06F 16/9535* (2019.01)

(52) U.S. Cl.
CPC .... *G06F 16/24578* (2019.01); *G06F 16/2228* (2019.01); *G06F 16/248* (2019.01); *G06F 16/24575* (2019.01); *G06F 16/9535* (2019.01)

(58) Field of Classification Search
CPC .......... G06F 17/3053; G06F 16/30321; G06F 17/30528
See application file for complete search history.

(56) References Cited

U.S. PATENT DOCUMENTS

| | | | | |
|---|---|---|---|---|
| 8,255,812 B1 * | 8/2012 | Parparita | ............... | G06F 16/958 715/762 |
| 9,509,790 B2 * | 11/2016 | Maes | ...................... | H04L 67/24 |
| 2010/0262599 A1 * | 10/2010 | Nitz | ..................... | G06F 17/3087 707/723 |

* cited by examiner

*Primary Examiner* — Loc Tran
(74) *Attorney, Agent, or Firm* — Park, Vaughan, Fleming & Dowler LLP; Chia-Hsin Suen

(57) ABSTRACT

The disclosed embodiments provide a system for processing data. During operation, the system stores a set of feed updates associated with a set of entities in descending chronological order within a set of resizable blocks. For each entity in the set of entities, the system generates an index containing one or more lists of resizable blocks storing a subset of the feed updates associated with the entity, wherein the one or more lists are sorted in descending chronological order. The system then uses the index to generate a content feed containing a selection of the feed updates for outputting to a viewer.

20 Claims, 6 Drawing Sheets

EFFICIENT INDEXING OF FEED UPDATES FOR CONTENT FEEDS

RELATED APPLICATION

This application claims the benefit of U.S. Provisional Application No. 62/315,537, entitled "Followfeed: LinkedIn's Feed Made Faster and Smarter," by inventors Ankit Gupta, Parinkumar D. Shah, Swapnil Ghike, Raghu Hiremagalur and Shubham Gupta, filed 30 Mar. 2016, which is incorporated herein by reference.

BACKGROUND

Field

The disclosed embodiments relate to filtering of digital content. More specifically, the disclosed embodiments relate to techniques for performing efficient indexing of feed updates for content feeds.

Related Art

Content feeds such as RSS (Really Simple Syndication) feeds and Atom feeds are mechanisms for presenting content to interested people (e.g., users or subscribers) without requiring them to manually access or retrieve the content from one or more content sources. For example, a social network may generate a news feed of photos, audio, video, documents, articles, posts, status updates, likes, comments, shares, and/or other types of content or social network interaction for each user accessing the social network. The user may then click on a posting of the content item within the news feed to navigate to a website on which the content item is hosted and access the entirety of the content item.

Moreover, the user experience with a content feed may be significantly impacted by the selection and ordering of content items in the content feed. For example, a provider of a content feed may risk user fatigue if a subscriber is presented with low-quality content items (e.g., spam), identical content items, content items that repeatedly cover the same subject, and/or content items that are not interesting or relevant to the user.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
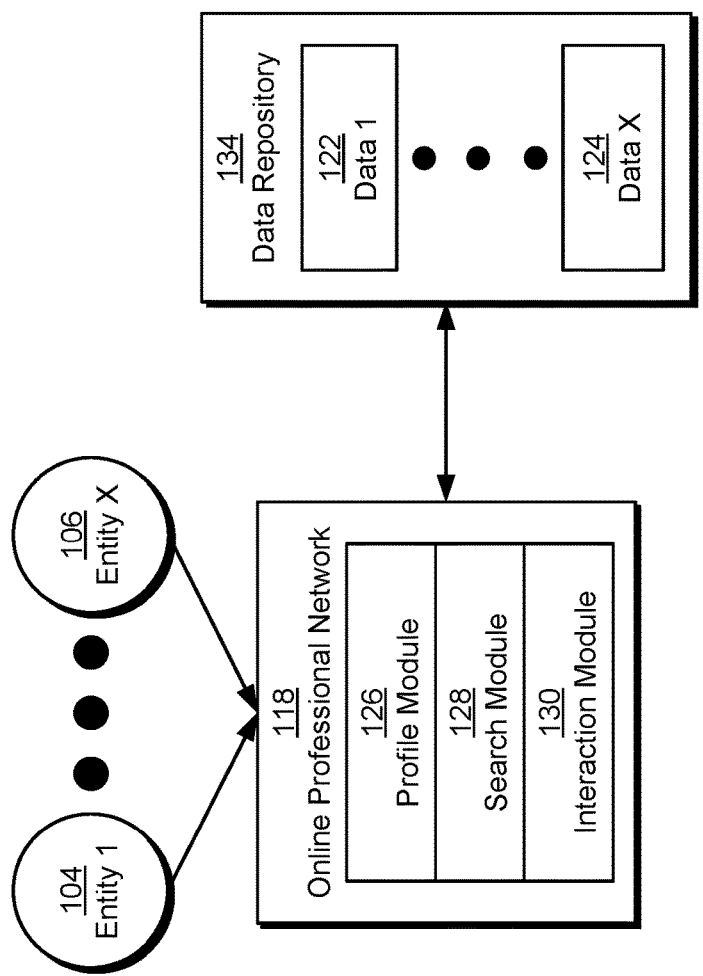
FIG. 1 shows a schematic of a system in accordance with the disclosed embodiments.

The disclosed embodiments provide a method, apparatus, and system for processing data. More specifically, the disclosed embodiments provide a method, apparatus, and system for indexing feed updates for inclusion in a content feed. As shown in FIG. 1, the feed updates may be associated with an online professional network 118 that is used by a set of entities (e.g., entity 1 104, entity x 106) to interact with one another in a professional and/or business context.

The entities may include users that use online professional network 118 to establish and maintain professional connections, list work and community experience, endorse and/or recommend one another, search and apply for jobs, and/or perform other actions. The entities may also include companies, employers, and/or recruiters that use online professional network 118 to list jobs, search for potential candidates, provide business-related updates to users, advertise, and/or take other action.

The entities may use a profile module 126 in online professional network 118 to create and edit profiles containing information related to the entities' professional and/or industry backgrounds, experiences, summaries, projects, skills, and so on. Profile module 126 may also allow the entities to view the profiles of other entities in the online professional network. For example, profile module 126 may be used to create, retrieve, and/or modify profiles containing demographic (e.g., gender, age range, nationality, location), professional (e.g., job title, employer, industry, experience, skills, seniority level, professional endorsements), social (e.g., organizations of which the user is a member, geographic area of residence), and/or educational (e.g., degree, university attended, certifications) attributes associated with the entities. The profiles may also specify groups to which the entities belong, relationships (e.g., connections, follows, friendships, family members, employment relationships, etc.) between the entities and other entities in the online professional network, and/or other data related to the entities' background, personal attributes, and/or professional attributes.

Next, the entities may use a search module 128 to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature on online professional network 118 to search for profiles, jobs, and/or information by categories such as first name, last name, title, company, school, location, interests, relationship, industry, groups, salary, experience level, etc.

The entities may also use an interaction module 130 to interact with other entities on online professional network 118. For example, interaction module 130 may allow an entity to add other entities as connections, follow other entities, exchange messages with other entities, join groups, and/or interact with (e.g., create, share, re-share, like, and/or comment on) posts from other entities.

Those skilled in the art will appreciate that online professional network 118 may include other components and/or modules. For example, the online professional network may include a homepage, landing page, and/or content feed that provides the latest postings, articles, and/or updates from the entities' connections and/or groups to the entities. Similarly, the online professional network may include mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, and/or other action performed by an entity in online professional network 118 may be tracked and stored in a database, data warehouse, cloud storage, and/or other data-storage mechanism providing data repository 134.

Figure 2:
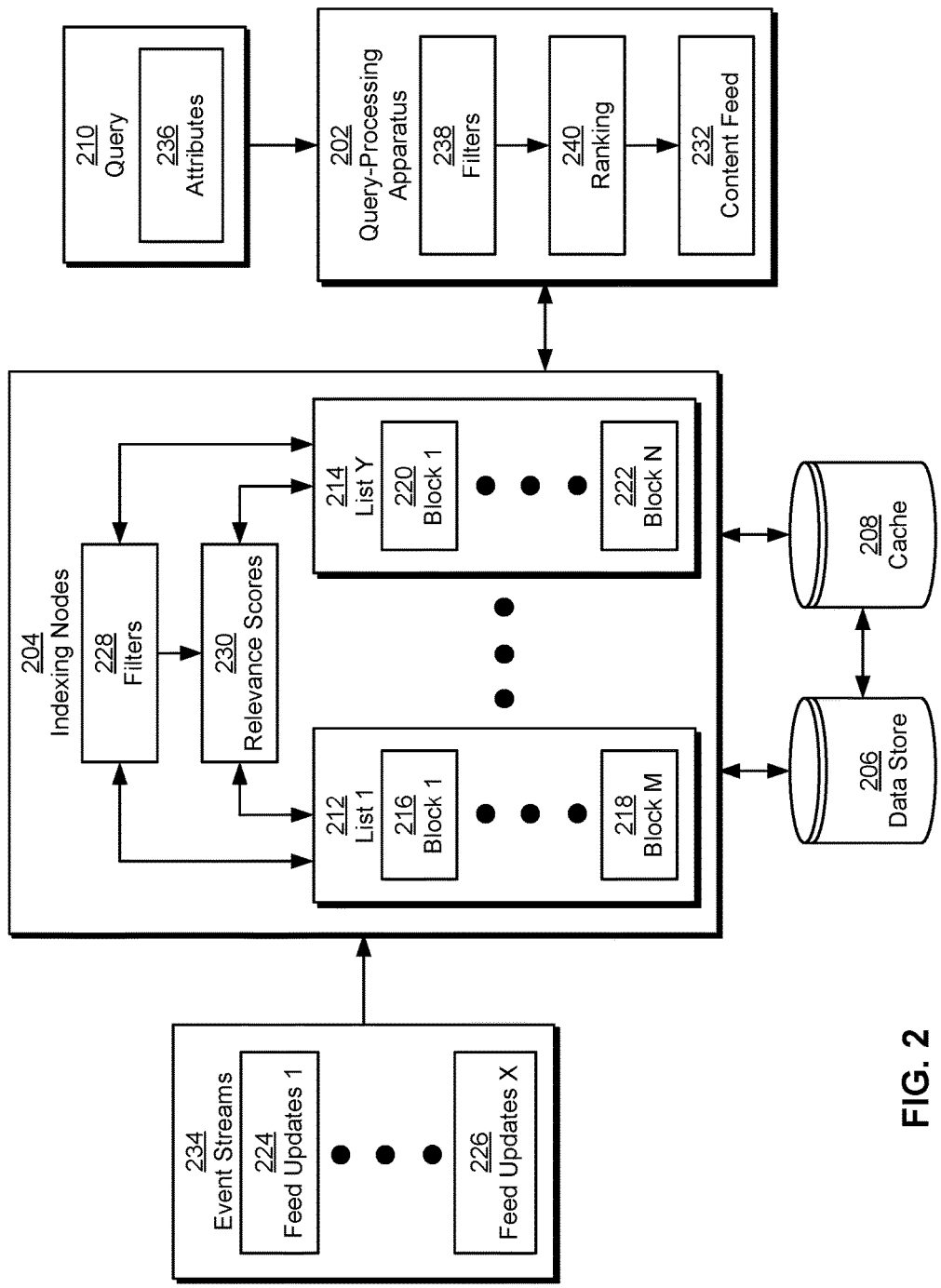
FIG. 2 shows a system for processing data in accordance with the disclosed embodiments.

As shown in FIG. 2, some or all data in data repository 134 and/or another primary data source may be distributed, transmitted, or otherwise provided in a number of event streams 234. Each event stream may include a series of feed updates (e.g., feed updates 1 224, feed updates x 226) associated with a social network (e.g., online professional network 118 of FIG. 1), a content publisher, and/or another source of content, user interaction, or data. The feed updates may include posts, articles, scheduled events, impressions, clicks, likes, dislikes, shares, hides, comments, mentions, views, updates, conversions, and/or other activity or content by or about various entities (e.g., users, companies, schools, groups, skills, tags, categories, locations, regions, etc.). For example, event streams 234 may include an event stream containing records of all activity on a social network, which is then partitioned into multiple event streams by one or more attributes of the records. Data in the event streams may then be processed by subscribers of the event streams on a real-time and/or offline basis.

The feed updates may also include content items associated with the activities, such as user profiles, job postings, user posts, status updates, messages, advertisements, event descriptions, articles, images, audio, video, documents, and/or other types of content. Representations of the content items may be stored in data repository 134 and/or another repository for subsequent retrieval and use. For example, the repository may include an identifier, location (e.g., Uniform Resource Locator (URL)), metadata, and/or content for some or all content items that are created, posted, featured, and/or shared using the online professional network. In turn, representations of the feed updates in event streams 234 may reference the corresponding content items and/or contain some or all of the content in the content items.

In one or more embodiments, profile data and activity data associated with the entities are used to generate and customize content feeds (e.g., content feed 232) of feed updates for the entities. For example, a website and/or mobile application associated with a social network may include a "news feed" of the latest activity and updates on the social network. To improve the user experience with the social network, updates in the news feed may be selected and/or ordered based on the behavior, characteristics, and/or interests of entities or related groups of entities (e.g., connections, follows, schools, companies, group activity, etc.) in the social network.

In addition, the system of FIG. 2 may store, index, and perform querying of feed updates from event streams 234 in a way that improves the generation and customization of content feeds containing the feed updates. More specifically, a number of indexing nodes 204 may store and/or index the feed updates using a data store 206 such as a key-value store, relational database, and/or other storage mechanism. The indexing nodes may also, or instead, store some or all of the feed updates and/or index structures in a cache 208 on a read-through, write-through, write-behind, cache-aside, and/or other basis.

Within data store 206, serialized forms of the feed updates may be sorted in reverse chronological order within a set of resizable blocks. In turn, indexing nodes 204 may index the stored feed updates using a key and a list of resizable blocks associated with the key, which are also sorted in reverse chronological order. For example, list 1 212 in the index may be a linked list of resizable blocks (e.g., block 1 216, block m 218), and list y 214 in the index may be a different linked list of resizable blocks (e.g., block 1 220, block n 222). Resizable blocks in each linked list may store feed updates associated with a given entity and update type (e.g., like, share, comment, post, view, connection, article, job listing, mention, etc.). Thus, the key for the linked list may be a serialized tuple, hash, and/or other combination of an entity ID for the entity and the update type. Within the linked list, each block may be associated with a unique key, such as a serialized tuple, hash, and/or other combination of the entity ID, the update type, and a non-negative integer representing the block's position in the linked list.

Each resizable block may be a byte array, "blob," and/or other physical or logical unit of storage in data store 206. Each feed update stored in the resizable block may include or be associated with metadata such as an entity ID of the corresponding entity, an update ID and update type of the feed update, and/or a time of creation. To facilitate querying of feed updates in the resizable blocks, the index may further include timestamps of the oldest and newest feed updates in each resizable block, a number of feed updates in the resizable block, a current size of the resizable block, and/or other metadata. The keys, lists of resizable blocks, time ranges, and/or numbers of feed updates in the index may be used to read and/or write feed updates in the resizable blocks according to the descending chronological order in which the feed updates and resizable blocks are organized.

Feed updates may additionally be written to a resizable block until a size limit (e.g., maximum number of feed updates, maximum number of bytes, etc.) for the resizable block is reached. When a write of a feed update causes the block to exceed the size limit, a new resizable block is created and added to the index, and a portion of feed updates associated with the original block is stored in the new block. For example, the most recent feed update to be written to a given list of resizable blocks may be written to the new block, and the new block may be added to the head of the list. On the other hand, the feed update may be an out-of-order update that predates some of the feed updates in the original block. To accommodate the out-of-order update, the original block may be split into two resizable blocks with two unique keys, feed updates in the original block may be divided between the two blocks, and the feed update may be stored in the block with the time range that includes the time of creation of the feed update.

Indexing nodes 204, data store 206, and/or cache 208 may be replicated and/or partitioned to accommodate requirements or limitations associated with the processing, performance, availability, or scalability of the system. For example, feed updates in data store 206 may be logically partitioned using the same partitioning function as event streams 234 so that an event stream partition can be consumed directly by an indexing node and stored in a corresponding partition in the data store. The partitioning function may further be used by one or more instances of a query-processing apparatus 202 to route queries to the indexing node, as discussed in further detail below. Because each event stream partition can directly consumed by a corresponding index node, replicas of the indexing node may be added by configuring each replica to subscribe to the same event stream partitions as the original indexing node.

Each indexing node may host multiple partitions of feed updates and perform reads and writes of the partitions using a corresponding instance of data store 206 and/or cache 208. For example, the indexing node may include or interface with a dedicated instance of the data store and/or cache. In addition, the number of partitions may be selected to be much larger than the number of indexing nodes 204 to avert repartitioning of data when new indexing nodes are added to the system. For example, the number of partitions may be selected to be an integer that is divisible by multiple smaller integers to allow the partitions to be evenly divided among different numbers of indexing nodes.

A horizontal hash-based partitioning strategy may be used to divide the index into the partitions. In the horizontal hash-based partitioning strategy, a pseudo-random hash function may be used to calculate a hash from a key used in querying of the feed updates, such as an entity ID of an entity associated with each feed update. The hash may be used to identify a partition of feed updates and/or other data associated with the entity, and all data associated with the key may be stored in the partition. For example, a hash value ranging from 1 to 1000 may be produced from the entity ID. The hash value may be matched to a numeric identifier for a partition, and all feed updates associated with the entity may be transmitted, stored, and indexed according to the partition. Consequently, a query for feed updates associated with the entity may be processed by a single indexing node containing the partition instead of multiple nodes across which feed updates that are indexed by update ID are distributed.

To generate content feed 232 for delivery to a viewer using the indexed feed updates, query-processing apparatus 202 may receive a query 210 containing attributes 236 associated with the viewer and/or content feed. For example, the attributes may include an entity ID of the viewer, a list of update types to be included in the content feed, criteria used to filter or rank the feed updates within the content feed, and/or a context of the query (e.g., type of content feed, viewer-specific attributes, delivery mechanism for the content feed, etc.). The query may also include a set of entity IDs of entities associated with feed updates used to produce the content feed, or the query may specify one or more types of relationships (e.g., connections, follows, friends, family, preferences, etc.) between the viewer and the entities. If the query includes relationship types instead of identifying specific entities, query-processing apparatus 202 and/or another component of the system may use a graph database and/or other repository of relationship data to resolve the relationship types into entity IDs of the entities that match the relationships.

Next, query-processing apparatus 202 may use the same partitioning mechanism used to partition the feed updates to partition query 210 into multiple sub-queries for processing by a number of indexing nodes 204. For example, query-processing apparatus 202 may convert entity IDs, update types, and/or other attributes 236 associated with the query into the partitions and/or a set of keys for lists of resizable blocks in the index. The query-processing apparatus may also use a mapping of the partitions and/or keys to indexing nodes 204 to group the keys by indexing nodes containing the keys. The query-processing apparatus may then generate a fan-out of the query to one or more instances or replicas of the indexing nodes.

In turn, each indexing node may receive, from query-processing apparatus 202, a request containing the corresponding grouping of keys from query 210. The request may include the list of keys from which feed updates are to be retrieved, a time range of the feed updates, and/or a number of feed updates per key or indexing node to be returned in response to the request. The request may also include parameters used to filter, score, or rank the feed updates. For example, the request may specify the retrieval of 100 feed updates from the last two weeks that pass the specified filters and are most relevant to the viewer.

The indexing node may use parameters from the request and metadata in the index to access a subset of resizable blocks in the corresponding lists that contain feed updates matching the request. For example, the indexing node may use timestamps of the oldest and newest feed updates in each resizable block to identify a subset of resizable blocks in each list storing feed updates in the time range in the request. The indexing node may retrieve the feed updates from the identified blocks and apply one or more filters 228 from the request to the feed updates. For example, the indexing node may filter the retrieved feed updates by parameters associated with privacy, location restrictions, update types, keywords, and/or other criteria.

Next, the indexing node may calculate a set of relevance scores 230 for the filtered feed updates. For example, the indexing node may retrieve a set of relevance features for each of the feed updates from data store 206, cache 208, and/or another data source and apply one or more transformations or scoring functions to the relevance features, attributes of the viewer, and/or parameters from the request to calculate a relevance score for the feed update. The indexing node may then rank the feed updates by the relevance scores and return the requested number of feed updates as a highest-ranked subset of the feed updates, along with the relevance scores of the feed updates. Because low latencies may be achieved by distributing the calculation of relevance scores 230 across multiple indexing nodes 204 and/or instances of the indexing nodes, content feed 232 may be generated from feed updates with more recent measures of relevance than feed updates with relevance scores that are calculated on an offline basis.

In one or more embodiments, relevance scores 230 are also calculated based on recent activities (e.g., likes, shares, clicks, views, searches, connections, follows, etc.) of the viewer that are collected on a near-realtime basis. For example, the indexing node and/or another component of the system may obtain records of the viewer's activities during a current or previous user session with a social network from an event stream and/or other low-latency data source. The indexing node may then use the records to tailor the relevance scores to the current or recent behavior of the viewer, thereby enabling generation of content feed 232 based on the "contextual relevance" of the feed updates to the viewer's behavior.

Query-processing apparatus 202 may aggregate feed updates from responses to the requests from indexing nodes 204 and optionally apply an additional set of filters 238 to the feed updates. For example, the query-processing apparatus may perform deduplication and/or similarity-based filtering of the feed updates. Finally, the query-processing apparatus may generate a ranking 240 of the filtered feed updates by relevance scores 230 to produce content feed 232, which is then returned in response to query 210 for display, transmission, and/or presentation to the viewer. For example, the query-processing apparatus may rank the feed updates in descending order of relevance score and use the ranking to order the feed updates in the content feed.

Those skilled in the art will appreciate that the system of FIG. 2 may be implemented in a variety of ways. For example, indexing nodes 204, query-processing apparatus 202, data store 206, and/or cache 208 may be provided by a single physical machine, multiple computer systems, one or more virtual machines, a grid, one or more clusters, one or more databases, one or more filesystems, and/or a cloud computing system. The functionality of indexing nodes 204 and query-processing apparatus 202 may additionally be implemented together and/or separately by one or more hardware and/or software components and/or layers.

Those skilled in the art will also appreciate that the system of FIG. 2 may be adapted to other types of functionality. For example, operations related to the partitioning, indexing, storage, time-based sorting, and querying of feed updates may be adapted for use with other types of data and/or use cases.

Figure 3:
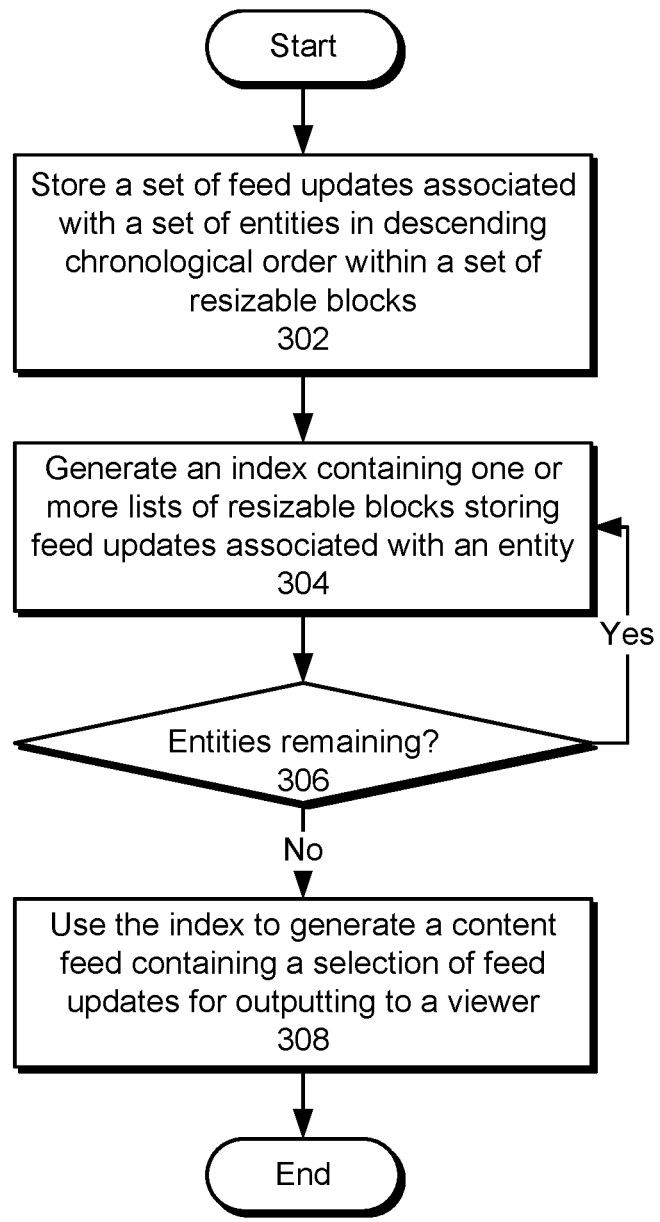
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a set of feed updates associated with a set of entities is stored in descending chronological order within a set of resizable blocks (operation 502), as described in further detail below with respect to FIG. 5. Next, an index containing one or more lists of resizable blocks storing feed updates associated with an entity is generated (operation 304). For example, the index may include a linked list of resizable blocks for each type of feed update associated with the entity. Each resizable block may store feed updates in reverse chronological order, and resizable blocks in the linked list may similarly be sorted in descending chronological order.

Indexing of the stored feed updates may be repeated for remaining entities (operation 306) in the set of entities. For example, a separate list of resizable blocks may be generated or updated for each entity with feed updates that were stored in operation 302. Finally, the index is used to generate a content feed containing a selection of feed updates for outputting to a viewer (operation 308), as described in further detail below with respect to FIG. 4.

Figure 4:
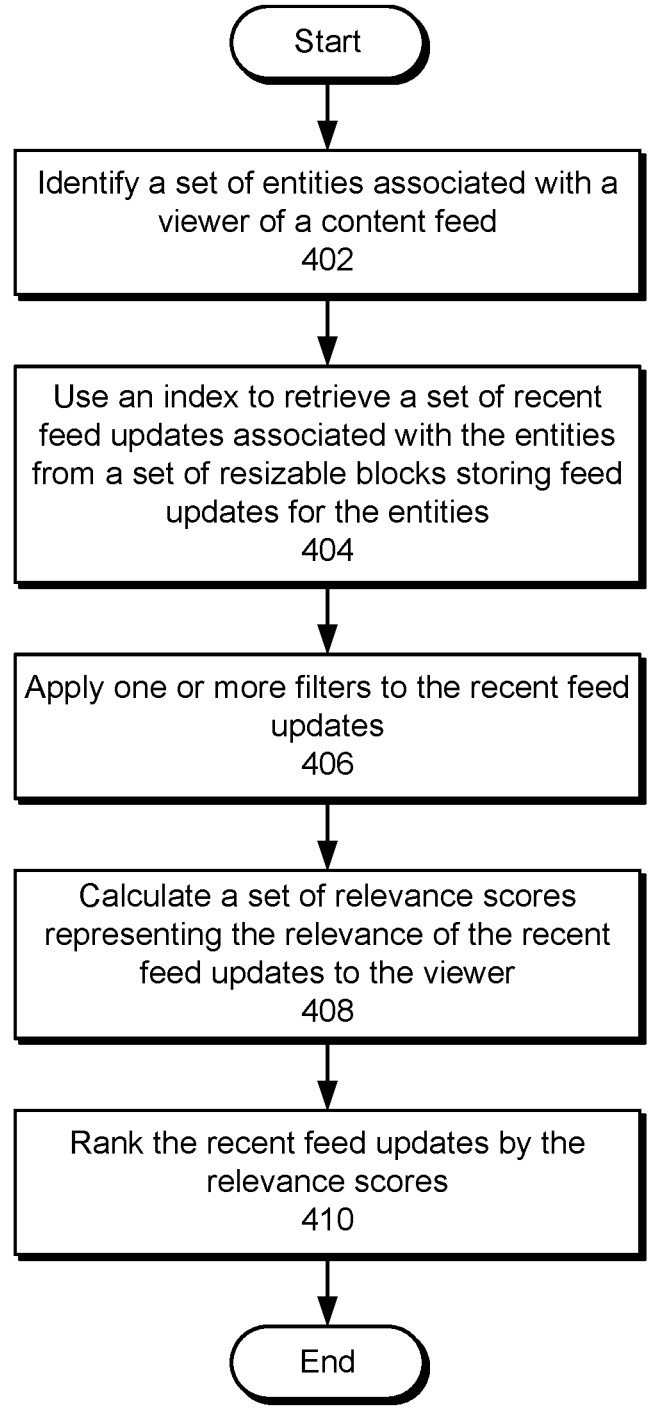
FIG. 4 shows a flowchart illustrating the process of using an index of feed updates to generate a content feed in accordance with the disclosed embodiments.

FIG. 4 shows a flowchart illustrating the process of using an index of feed updates to generate a content feed in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a set of entities associated with a viewer of the content feed is identified (operation 402). For example, the set of entities may include content publishers, connections, schools, companies, influencers, skills, tags, interests, categories, and/or other attributes related to the viewer's relationships or preferences. The entities may be specified in a query and/or identified using one or more attributes from the query.

Next, an index is used to retrieve a set of recent content updates associated with the entities from a set of resizable blocks storing feed updates for the entities (operation 404). As described above, the index may include a list (e.g., linked list) of resizable blocks sorted in descending chronological order, with feed updates in each resizable block also sorted in descending chronological order. In other words, the index may generally organize feed updates associated with a given key (e.g., entity ID and update type) into a list of feed updates in descending chronological order. Metadata in the index (e.g., keys, timestamps of the oldest and newest feed updates in each block, the number of feed updates in each block, etc.) may be used to identify and access a number of resizable blocks containing feed updates in a time range of the query (e.g., the most recent week, the last two weeks, etc.), and the feed updates may be retrieved from the resizable blocks.

One or more filters are then applied to the recent feed updates (operation 406), and a set of relevance scores representing the relevance of the recent feed updates to the viewer is calculated (operation 408). For example, the recent feed updates may be filtered using criteria related to privacy, geographic restrictions, and/or viewer preferences, and the relevance scores may be calculated using relevance features associated with the feed updates and the viewer, the recent activity of the viewer, and/or one or more relevance models and/or scoring functions.

Finally, the recent feed updates are ranked by the relevance scores (operation 410). For example, the feed updates may be ranked in descending order of relevance score, and some or all of the ranked feed updates may be returned for additional filtering, ranking, and/or inclusion in the content feed.

Figure 5:
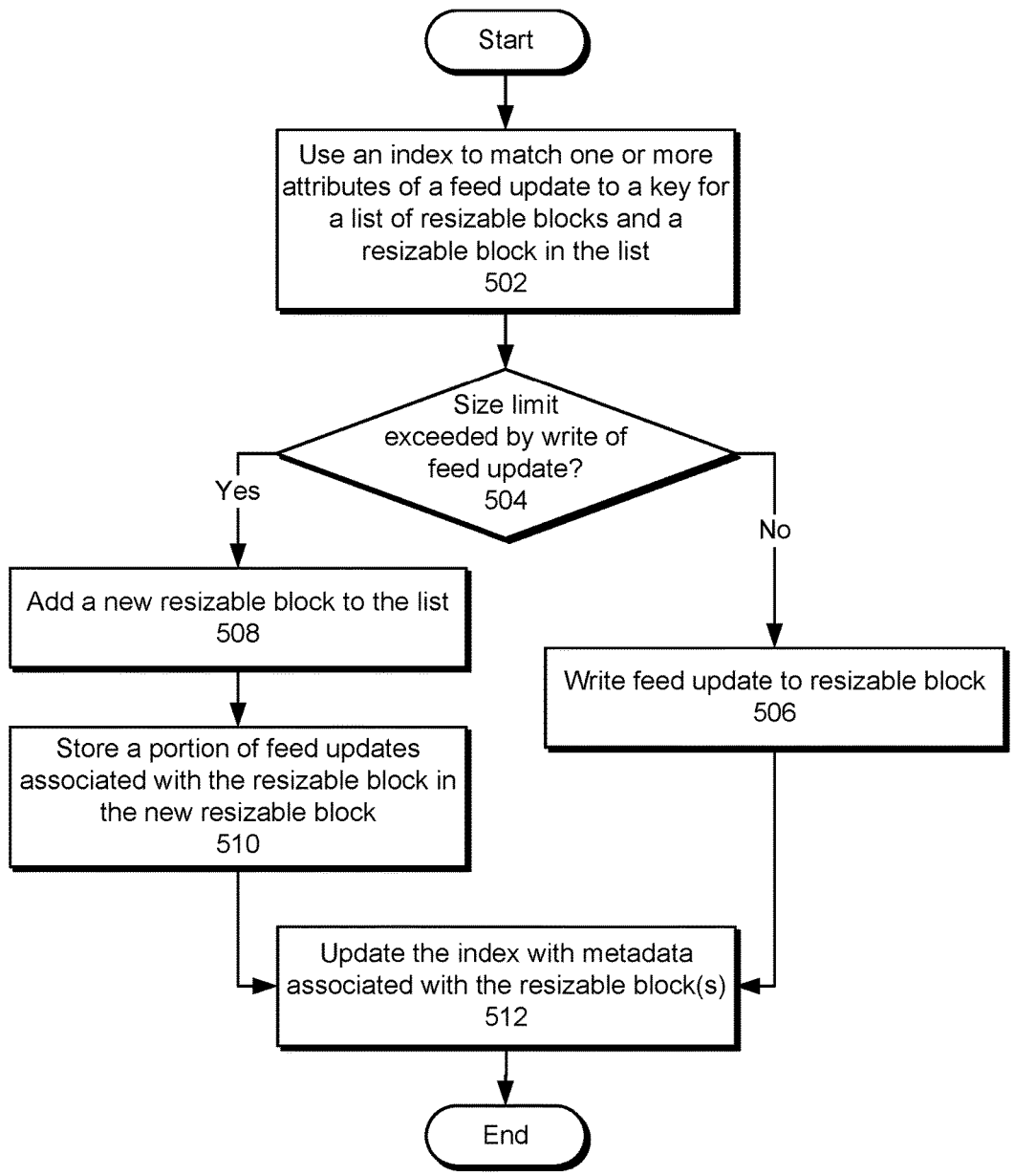
FIG. 5 shows a flowchart illustrating the process of storing a feed update in a resizable block in accordance with the disclosed embodiments.

FIG. 5 shows a flowchart illustrating the process of storing a feed update in a resizable block in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, an index is used to match one or more attributes of the feed update to a key for a list of resizable blocks and a resizable block in the list (operation 502). For example, an entity identifier and content type from the feed update may be matched to a key of a resizable block that forms a head of a linked list of resizable blocks. A time of creation of the feed update may then be matched to a resizable block in the linked list using time ranges captured by metadata in the index (e.g., timestamps of the oldest and newest feed updates in each resizable block).

A size limit of the resizable block may be exceeded by a write of the feed update (operation 504) to the resizable block. For example, the addition of the feed update to the resizable block may cause the resizable block to exceed the maximum number of feed updates and/or bytes in the block. If the size limit is not exceeded by a write of the feed update, the feed update is written to the resizable block (operation 506).

If the size limit is exceeded by a write of the feed update to the resizable block, a new resizable block is added to the list (operation 508), and a portion of feed updates associated with the original resizable block is stored in the additional resizable block (operation 510). For example, the feed update may be written to the new resizable block if the feed update is more recent than the newest feed update in the original resizable block. The new resizable block may form a new head of the linked list and link to the original resizable block to maintain the descending chronological order of the blocks in the linked list.

On the other hand, if the feed update is older than some of the feed updates in the original resizable block, the original resizable block may be split into two resizable blocks, a number of feed updates from the original block may be moved to the second block, and the feed update may be stored in the resizable block with a time range that encompasses the creation time of the feed update. The feed update may additionally be written to a cache associated with the index before or after the feed update is written to the original or new resizable block.

Finally, the index is updated with metadata associated with the resizable block(s) (operation 512). For example, the number of feed updates in each resizable block and/or timestamps of the oldest and/or newest feed updates in the resizable block may be updated based on the write. If a new resizable block has been added to the list, the index may be updated with a key for the new resizable block.

Figure 6:
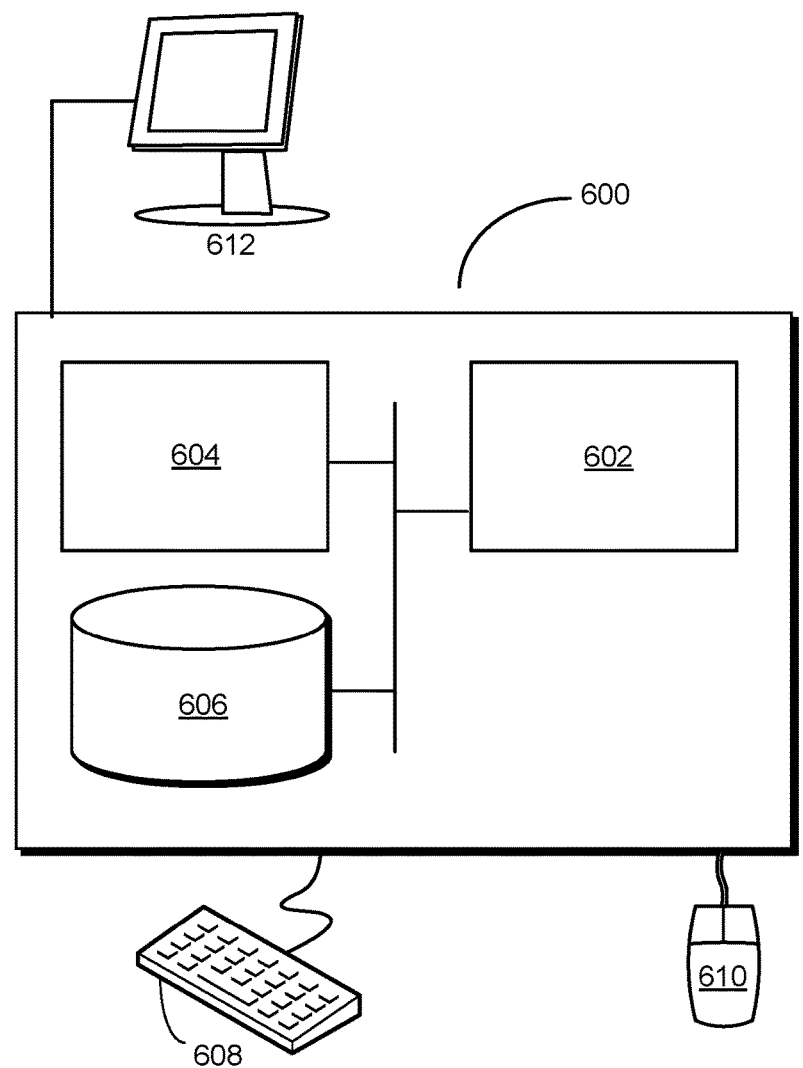
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for processing data. The system may include a number of indexing nodes that store a set of feed updates associated with a set of entities in descending chronological order within a set of resizable blocks. For each entity in the set of entities, the indexing nodes may generate an index containing one or more lists of resizable blocks storing a subset of the feed updates associated with the entity, wherein the one or more lists are sorted in descending chronological order. The indexing nodes may then use the index to generate a content feed comprising a selection of the feed updates for outputting to a viewer.

In addition, one or more components of computer system 600 may be remotely located and connected to the other components over a network. Portions of the present embodiments (e.g., indexing nodes, query-processing apparatus, data store, cache, etc.) may also be located on different nodes of a distributed system that implements the embodiments. For example, the present embodiments may be implemented using a cloud computing system that uses an index of feed updates to produce content feeds for outputting to a set of remote viewers.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   for each entity in a set of entities within an online network, generating a corresponding index comprising one or more lists of resizable blocks storing feed updates associated with the entity, wherein each list of resizable blocks is associated with a different feed update type;
   storing a set of new feed updates associated with the entities in descending chronological order by, for each entity:
      using the index corresponding to the entity to match one or more attributes of a new feed update associated with the entity to a key for a list of resizable blocks, wherein:
         each resizable block represents a storage block in memory; and
         the key for the list of resizable blocks includes the feed update type associated with the list and an entity ID for the entity;
      writing the new feed update to a first resizable block in the list; and
      when a size limit of the first resizable block is exceeded by a write of another new feed update to the first resizable block:
         adding a second resizable block to the list; and
         storing a portion of feed updates associated with the first resizable block in the second resizable block;
   using the indexes to generate, by a computer system, a content feed comprising a selection of stored feed updates for outputting to a viewer;
   generating a visual representation of the content feed comprising the selected feed updates; and
   presenting the visual representation of the content feed to the viewer.

2. The method of claim 1, wherein using the indexes to generate the content feed comprises:
   identifying a subset of the entities associated with the viewer;

using the indexes to retrieve a set of recent feed updates associated with the subset of entities;
calculating a set of relevance scores representing a relevance of the recent feed updates to the viewer; and
ranking the recent feed updates by the relevance scores.

3. The method of claim 2, wherein using the indexes to generate the content feed further comprises:
applying one or more filters to the set of recent feed updates prior to ranking the recent feed updates by the relevance scores.

4. The method of claim 2, wherein using the indexes to retrieve the set of recent feed updates comprises:
using metadata in the indexes to access a subset of the resizable blocks comprising a time range of feed updates in the content feed.

5. The method of claim 4, wherein the metadata comprises:
a first timestamp of an oldest feed update in a resizable block;
a second timestamp of a newest feed update in the resizable block; and
a number of feed updates in the resizable block.

6. The method of claim 1, wherein storing the portion of feed updates associated with the first resizable block in the second resizable block comprises:
moving the portion of feed updates from the first resizable block to the second resizable block.

7. The method of claim 1, wherein the one or more attributes comprise:
an entity identifier; and
a feed update type.

8. The method of claim 1, wherein the entity is at least one of:
a user;
a company;
an educational institution;
a group;
a skill; and
a tag.

9. The method of claim 1, wherein each of the feed updates comprises:
an entity identifier;
an update identifier;
a feed update type; and
a time of creation.

10. The method of claim 1, wherein the set of feed updates comprises at least one of:
a post;
an article;
a job listing;
a like;
a share;
a comment;
a follow;
a connection;
an interaction with a group;
a profile update;
a profile view;
a click; and
a hide.

11. An apparatus, comprising:
one or more processors; and
memory storing instructions that, when executed by the one or more processors, cause the apparatus to:
for each entity in a set of entities within an online network, generate a corresponding index comprising one or more lists of resizable blocks storing feed updates associated with the entity, wherein each list of resizable blocks is associated with a different feed update type;
store a set of new feed updates associated with the entities in descending chronological order by, for each entity:
using the index corresponding to the entity to match one or more attributes of a new feed update associated with the entity to a key for a list of resizable blocks, wherein:
each resizable block represents a storage block in memory; and
the key for the list of resizable blocks includes the feed update type associated with the list and an entity ID for the entity;
writing the new feed update to a first resizable block in the list; and
when a size limit of the first resizable block is exceeded by a write of another new feed update to the first resizable block:
adding a second resizable block to the list; and
storing a portion of feed updates associated with the first resizable block in the second resizable block;
use the indexes to generate a content feed comprising a selection of stored feed updates for outputting to a viewer;
generate a visual representation of the content feed comprising the selected feed updates; and
present the visual representation of the content feed to the viewer.

12. The apparatus of claim 11, wherein using the indexes to generate the content feed comprises:
identifying a subset of the entities associated with the viewer;
using the indexes to retrieve a set of recent feed updates associated with the subset of entities;
calculating, for the set of recent feed updates, a set of relevance scores representing a relevance of the recent feed updates to the viewer; and
ranking the recent feed updates by the relevance scores.

13. The apparatus of claim 12, wherein using the indexes to retrieve the set of recent feed updates comprises:
using metadata in the index to retrieve a subset of the resizable blocks comprising a time range of feed updates in the content feed.

14. The apparatus of claim 13, wherein the metadata comprises:
a first timestamp of an oldest feed update in a resizable block;
a second timestamp of a newest feed update in the resizable block; and
a number of feed updates in the resizable block.

15. The apparatus of claim 11, wherein storing the portion of feed updates associated with the first resizable block in the second resizable block comprises:
moving the portion of feed updates from the first resizable block to the second resizable block.

16. The apparatus of claim 11, wherein the one or more attributes comprise:
an entity identifier; and
a feed update type.

17. A system, comprising:
one or more processors; and
a storage mechanism comprising a non-transitory computer-readable medium comprising instructions that, when executed, cause the system to store a set of feed updates associated with a set of entities within an online network in descending chronological order by, for each entity:
using the index corresponding to the entity to match one or more attributes of a new feed update associated with the entity to a key for a list of resizable blocks, wherein:
each resizable block represents a storage block in memory; and
the key for the list of resizable blocks includes the feed update type associated with the list and an entity ID for the entity;
writing the new feed update to a first resizable block in the list; and
when a size limit of the first resizable block is exceeded by a write of another new feed update to the first resizable block:
adding a second resizable block to the list; and
storing a portion of feed updates associated with the first resizable block in the second resizable block; and
an indexing apparatus comprising a non-transitory computer-readable medium comprising instructions that, when executed, cause the system to:
for each entity in a set of entities within an online network, generating a corresponding index comprising one or more lists of resizable blocks storing feed updates associated with the entity, wherein each list of resizable blocks is associated with a different feed update type;
use the indexes to generate a content feed comprising a selection of stored feed updates for outputting to a viewer;
generate a visual representation of the content feed comprising the selected feed updates; and
present the visual representation of the content feed to the viewer.

18. The system of claim 17, wherein using the indexes to generate the content feed comprises:
identifying a subset of the entities associated with the viewer;
using the indexes to retrieve a set of recent feed updates associated with the subset of entities;
calculating, for the set of recent feed updates, a set of relevance scores representing a relevance of the recent feed updates to the viewer; and
ranking the recent feed updates by the relevance scores.

19. The method of claim 1, wherein:
each resizable block in the list of resizable blocks is associated with a unique key that includes the entity ID, the feed update type and a non-negative integer representing a position of the resizable block in the list of resizable blocks.

20. The apparatus of claim 11, wherein:
each resizable block in the list of resizable blocks is associated with a unique key that includes the entity ID, the feed update type and a non-negative integer representing a position of the resizable block in the list of resizable blocks.

* * * * *